(12) United States Patent
Im

(10) Patent No.: US 7,522,652 B2
(45) Date of Patent: Apr. 21, 2009

(54) FINGER USING CHIP-RATE WEIGHTING IN SMART ANTENNA SYSTEM, AND ITS APPLICATION FOR DEMODULATION APPARATUS AND METHOD

(75) Inventor: Heung-Jae Im, Seoul (KR)

(73) Assignee: Seung-Won Choi, Seoul (KR)

( * ) Notice: Subject to any disclaimer, the term of this patent is extended or adjusted under 35 U.S.C. 154(b) by 1162 days.

(21) Appl. No.: 10/814,285

(22) Filed: Apr. 1, 2004

(65) Prior Publication Data

US 2004/0184429 A1   Sep. 23, 2004

Related U.S. Application Data

(63) Continuation of application No. PCT/KR02/01927, filed on Oct. 15, 2002.

(30) Foreign Application Priority Data

Oct. 15, 2001   (KR) ............................... 2001-63543

(51) Int. Cl.
*H04B 1/00* (2006.01)
(52) U.S. Cl. ...................... 375/147; 375/150
(58) Field of Classification Search ................ 375/136, 375/142, 144, 147, 148, 149, 150
See application file for complete search history.

(56) References Cited

U.S. PATENT DOCUMENTS

2004/0184428 A1* 9/2004 Im ............................ 370/342
2004/0184515 A1* 9/2004 Im ............................ 375/148
2007/0127605 A1* 6/2007 Sindhushayana ............ 375/341

FOREIGN PATENT DOCUMENTS

| JP | 1998-308689 | 11/1998 |
| JP | 2000-324016 | 11/2000 |
| WO | 00/31909 | 6/2000 |
| WO | 01/41318 | 6/2001 |
| WO | 01/67627 | 9/2001 |

OTHER PUBLICATIONS

Translation of Japanese Office Action.

* cited by examiner

*Primary Examiner*—Emmanuel Bayard
(74) *Attorney, Agent, or Firm*—Lowe Hauptman Ham & Berner, LLP

(57) ABSTRACT

The present invention relates to a finger using chip-rate weighting in Smart Antenna System, and an apparatus and method for Demodulating signals using such a finger. The present invention is useful in a wireless communication network having a reverse pilot channel. Further, by using such a finger, the present invention provides a demodulation apparatus and method for making high-speed broadband communications available in a smart antenna system. In such 3-G wireless communications where both traffic signals and pilot signals are transmitted from a terminal, the present invention calculates optimized weight vectors using the pilot signal and the calculated weight vectors are adapted to each traffic signal with a chip-rate weight.

27 Claims, 14 Drawing Sheets

FINGER USING CHIP-RATE WEIGHTING IN SMART ANTENNA SYSTEM, AND ITS APPLICATION FOR DEMODULATION APPARATUS AND METHOD

This is a continuation of PCT/KR02/01927 filed Oct. 15, 2002 and published in English.

TECHNICAL FIELD

This invention relates to a demodulation technique performing a signal reception in mobile communication environments, e.g., Code Division Multiple Access (CDMA)-type mobile communication, etc. More specifically, this invention relates to a finger that is applicable to smart antenna system with chip-rate weighting, a demodulation apparatus and method that applies the finger, and a computer-readable recording medium for recording a program that embodies the method.

BACKGROUND ART

The importance of smart antenna system is widely recognized as a tool for efficiently increasing the capacity of mobile communication system. In general, it has been known that the smart antenna system enhances the performance of wireless communication system through a spatially selective reception, which causes the interfering signals to be reduced or resolved.

In conventional cases, the weighting information needed in smart antenna system is obtained from the traffic channel in reverse link. The intrinsic characteristic of the traffic channel that the integration interval for despreading procedure cannot be taken long enough, however, the information cannot help being deteriorated.

In order to resolve this problem, there was a Korean Patent No. 239177 registered on Oct. 19th of 1999 entitled, "Receiving Apparatus and Method of Smart Antenna using Pilot Signals in CDMA Mobile Telecommunication System." In the Korean patent 239177, the signal at each antenna element is multiplied by an adaptive weight and combined to produce array output. The output is despreaded with the PN code and properly filtered. In order to produce the reference signal, however, the filtered signal is multiplied again by the same PN code. The technique disclosed in the patent 239177 is based on error signal produced from the difference between the array output and the reference signal. The adaptive procedure produces the weights to be multiplied by the received signals at the multiple numbers of antenna elements by minimizing the error signal by means of well-known technique, Least Mean Square algorithm.

The problem in this method, however, is in executing the LMS algorithm which essentially needs the reference signal for producing the difference to be minimized at each adaptation step. In fact, the procedure of multiplying the PN code to the despreaded received signal is needed only to produce the reference signal. It is absolutely irrelevant to the reception or demodulation procedure itself. The procedure of producing the reference signal must cause additional delays and errors as well as the complexity due to PN-code multiplication.

As another technique, there is a Korean patent application 1999-28020 which has been published on Feb. 5th of 2001, entitled "CDMA Signal Demodulator for an adaptive smart antenna system." In this invention, CDMA signal demodulator in the adaptive smart antenna system consists of a searcher bank for PN-code acquisition, a finger bank which produces accurate timing information, a correlator bank which produces the despreaded data, a beam-forming parameter computer which produces the weights to be multiplied to received signal, a beam-forming multiplier which produces the array output by multiplying the weights to the received signal, and a multipath combiner which aligns the despreaded data in time domain.

The problem in this technique is that it does not provide how each block (or, equivalently, bank) co-operates and interfaces to each other. One practical phenomenon caused by that defect is the initial PN-code acquisition cannot be achieved. In order for the smart antenna system shown in the Korean patent application 1999-28020 to work as properly as claimed, it should be assumed that all the timing information needed at each block must be provided externally, which is not true in real situations. For example, both initial PN-code acquisition and multipath searching should somehow be achieved apriori at the beginning stage, which is never realistic in practical situations, for the correlator bank to work properly. More specifically, the technique disclosed in the Korean patent application 1999-28020 fails to provide how the timing information is provided from the searcher bank to the correlator bank and the beam-forming parameter computer such that the correlation for despreading the received signal and computing the weights at a proper time cannot be achieved. Also, without specifying the detailed method, of PN-code acquisition, multipath combining, which is essential in CDMA receiver, can never be achieved as well.

Therefore, the system shown in the Korean patent application 1999-28020 must start with inaccurate timing information at the beginning stage, which results in extremely adverse reliability. In addition, inaccurate timing information results in tremendously slow convergence in adapting the weights even if it can converge. Mostly, it does not converge at all.

Another technique is disclosed in a Korean patent application 1999-30463 published on Feb. 15th of 2001, entitled "Smart Antenna System having a beam-former and an adaptive equalization combiner for multipath signals." The main part of this technique is that a beam-forming can be achieved through an adaptive beam-forming algorithm instead of selection diversity through the searcher bank.

In this technique as well as in the previous ones, there is no explanation about how the timing information is obtained. More specifically, it is assumed in this technique that the searching is perfectly obtained apriori at the beginning stage, i.e., stage before the despreading procedure for the chip-level weighting, which is never true in real situations. As in the previous case, i.e., 1999-28020, the inaccurate timing information due to the lack of specified searching technique must cause very slow converge in the adaptation Of weights even if the procedure does not diverge. The slow convergence leads to a serious degradation in performance of smart antenna system.

In addition, this technique fails to disclose for any normal people with common knowledge to understand how the adaptive beam-forming algorithm searches for the weights.

DISCLOSURE OF INVENTION

This invention has been proposed to resolve the problems in the conventional techniques discussed above. The objective of this invention is to provide a finger with a main emphasis on the application to a smart antenna system for tracking of each user and providing high speed wide-band communication by weighting received data carried in traffic channels in chip-rate with the weights computed from pilot channel signal in the reverse link.

This invention also provides a demodulation apparatus of a smart antenna system using the fingers operating in chip-rate for tracking of each user and achieving high speed wide-band communication by weighting the received data carried in traffic channels with the weights computed from pilot channel signal in the reverse link.

This invention also provides a demodulation method of a smart antenna system using the fingers operating in chip-rate for tracking of each user and achieving high speed wide-band communication by weighting the received data carried in traffic channels with the weights computed from pilot channel signal in the reverse link.

This invention also provides a computer-readable recording medium for recording a program that embodies the method using fingers operating in chip-rate for tracking of each user and achieving high speed wide-band communication by weighting the received data carried in traffic channels with the weights computed from pilot channel signal in the reverse link.

Those who are skilled in the art of the present invention will easily recognize another purposes and advantages of the invention from the drawings, detailed description of the invention, and claims.

In accordance with one aspect of the present invention, there is provided a finger operating in chip-rate, comprising: descrambling means that descrambles base-band received signals by using frame time information (f_timing); a first pilot retrieving means for retrieving a pilot signal that is to be used as input of a weight vector computing means to compute the weight vector; the weight vector computing means that produces the weight vector by using signals from the descrambling means and the first pilot retrieving means; general weighting means for producing a general weighted signal, by compensating phase delay of the base-band received signal with the weight vector; a second pilot retrieving means for retrieving the pilot signal that is to be used to compensate path delay, by using outputs of the general weighting means and a PN-code; Walsh despreading means for providing received data for each of traffic channels, by using outputs of the general weighting means, the PN-code, and corresponding Walsh codes; and channel compensation means for compensating phase distortion caused by the path delay to each output of the Walsh despreading means, by using output of the second pilot retrieving means.

In addition, the finger further comprises a tracking means for producing frame tracking information that is used to compensate small changes of the path delay that might occur during communication.

In order to achieve above-mentioned objectives, this invention also provides a demodulation apparatus using the finger operating in chip-rate in a smart antenna system, comprising: a means of converting analog signal to digital data for generating digital data from received analog signal, which will be referred to as "ADC (analog to digital converter)" for simplicity in this manuscript, through oversampling procedure after frequency-down conversion into base band; a searcher for transmitting searcher-energy that exceeds preset threshold value to Lock-detector while the searcher-energy is computed through correlation procedure between output of the ADC and the PN-code corresponding to the pilot channel; a lock detector for setting frame synchronization with the search energy provided from the searcher and for transmitting information of frame reset(f_reset), frame timing(f_timing), and frame death(f_death) to corresponding block; and at least one the finger in which the traffic channel signals are weighted in chip-rate with the weights which are obtained from the received data in the pilot channel of the reverse link.

Also, the searcher that is applied in the demodulation apparatus of the smart antenna system that weights the received signal in chip-rate comprises followings: a received signal processing means for achieving envelope detection of the received data such that the correlation energy to be obtained at each antenna channel; an adding means for summing up the correlation energies at each of antenna channels obtained from the received signal processing means; and an output means for generating result of the adding means as final output of non-coherent detection.

In order to achieve above-mentioned objectives, this invention also provides a demodulation method using the finger operating in chip-rate in the smart antenna system comprises following steps: first step of descrambling received signal, which is given in base band after frequency-down conversion at output port of analog-to-digital converter, by multiplying the PN-code to the received signal using frame timing information (f_timing); second step of generating a pilot signal obtained by integrating the descrambled signal in order to use it for computing weights; third step of computing a weight vector using the descrambled data and the pilot signal; fourth step of generating an array output by summing up the results of multiplication between the weight vector and the received signal in such a way that inter-element phase difference be compensated; fifth step of generating the pilot signal for compensating phase distortion due to channel delay by integrating result of the multiplication of the PN-code and the array output; sixth step of separating each channel signal from the array output through the Walsh despreading procedure; and seventh step of compensating the phase distortion due to the channel delay by applying the pilot signal to each channel signal which has been obtained through the Walsh despreading procedure.

The demodulation method disclosed in this invention can also comprise the fourth step (507) of generating the array output and the fifth step (509) of generating the pilot signal actually as a single step.

In order to achieve above-mentioned objectives, this invention also provides A computer-readable recording medium for recording a program that embodies the method using fingers operating in chip-rate, comprising: a first function of descrambling a received signal by multiplying a PN-code to the received signal using frame timing information; a second function of generating the pilot signal as input of computing a weight vector by integrating a descrambled signal; a third function of computing the weight vector by using the descrambled signal and the pilot signal; a fourth function of generating an array output by first multiplying the received signal by a weight vector and then summing up results of multiplications of the received signal and the weight vector; a fifth function of retrieving the pilot signal for compensating phase distortion due to path delay by integrating multiplication of the PN-code and the array output; a sixth function of separating the array output into each of traffic channel signals through the Walsh despreading; and a seventh function of compensating the each traffic channel data despreaded through the sixth function using the pilot signal retrieved through the fifth function.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Objectives, characteristics, and merits of this invention described above will be more clarified through explanations given in this section. In explaining this invention, details of conventional techniques that are used in common with this invention have been excluded in this document because, otherwise, it may confuse originalities disclosed only in this invention. This section presents desirable examples applying techniques disclosed in this invention together with figures.

Figure 1:
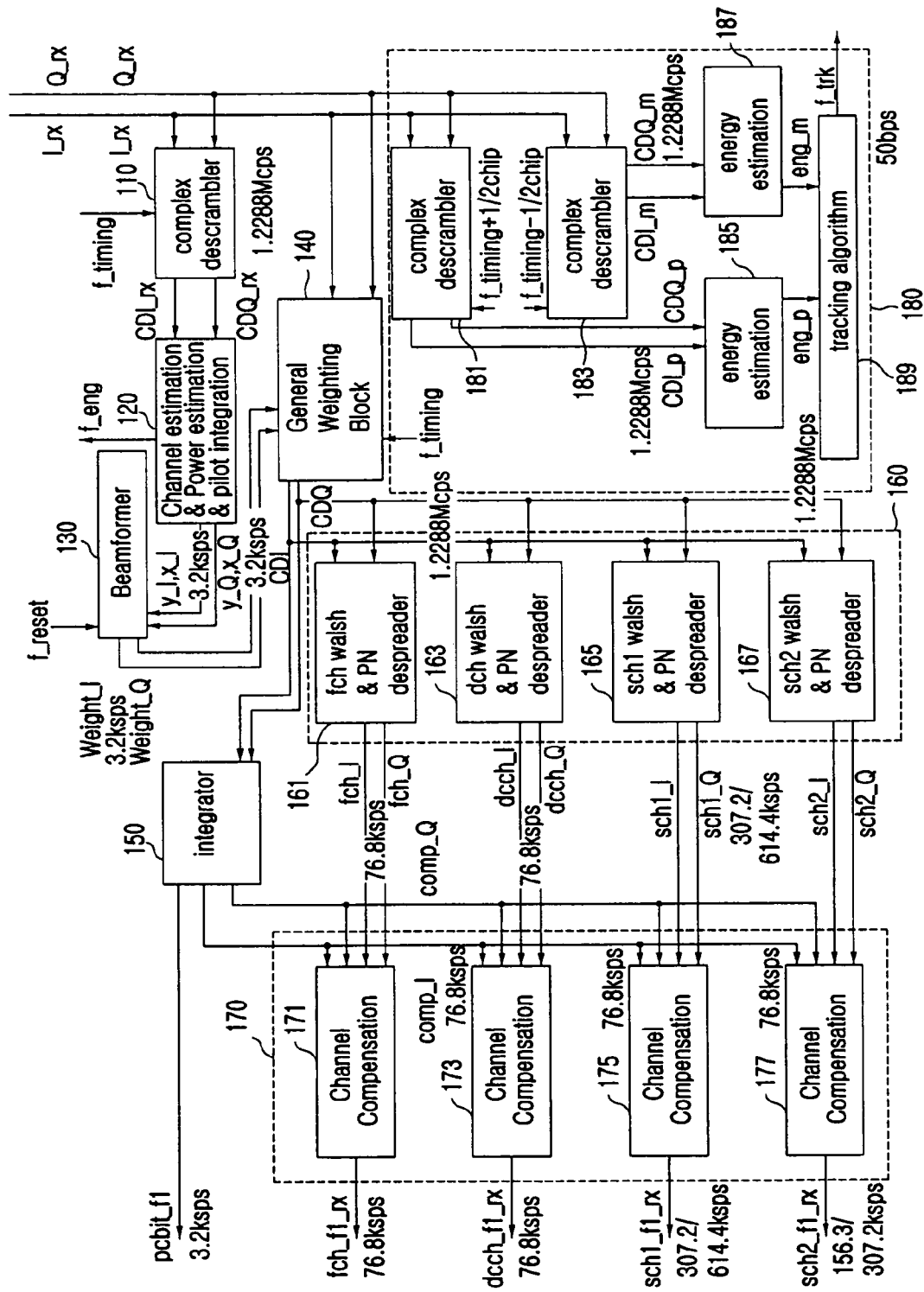
FIG. 1 illustrates one desirable example of a block-diagram of a finger operating in chip-rate disclosed in this invention.

FIG. 1 illustrates one desirable example of a block-diagram of the finger operating in chip-rate disclosed in this invention. In FIG. 1, 110, 120, 130, 140, 150, 160, 170, and 180 represent a descrambling part, a pilot signal generating part #1, a weight vector (beam-forming parameter) computing part, a general weighting part, a pilot signal generating part #2, a Walsh despreading part, a phase distortion compensating part, and a tracking part, respectively.

As illustrated in figures, the finger according to this invention, which can be applied to the smart antenna system, is composed of following parts: descrambling part (110) that descrambles received signal by multiplying the PN-code to the received signal using the frame timing information provided from outside the finger, i.e., the lock detector; the pilot signal generating part #1 (120) that generates the pilot signal to be used as input of the weight vector computing part by integrating output of the descrambling part (110); the weight vector (beam-forming parameter) computing part (130) that computes the weight vector using the descrambled signal and pilot signal provided from the descrambling part (110) and pilot signal generating part #1 (120), respectively; the general weighting part (140) that produces the array output by multiplying the received signal by the weight vector and summing up results of the multiplications in such a way that the inter-element phase difference between antenna elements to be compensated. In addition, the finger presented in this invention is also composed of the pilot signal generating part #2 (150) for generating the pilot signal that is used to compensate the phase distortion due to the path delay. In addition, the finger presented in this invention is also composed of following parts: the Walsh despreading part (160) that separates the array output into each of traffic channel signals by multiplying the Walsh code assigned at each of traffic channels to the descrambled array output obtained by multiplying the PN-code to the array output coming from the general weighting part (140), and the phase distortion compensating part (170) for compensates the phase distortion of each output of the Walsh despreading part (160) due to the path delay using output of the pilot signal generating part #2 (150).

Furthermore, this invention also provides the tracking part (180) inside the finger operating in chip-rate that generates the frame tracking information (f_trk) in order to compensate small change in path delay such that fine-tuning of tracking can be achieved in a given the finger.

The weight vector computing part (130) provides the beam-forming parameter, i.e., the weight vector, by processing the received signal in accordance with preset arithmetic procedure. The weight vector is complex-valued vector of which real and imaginary part will be denoted in this document by Weight_I and Weight_Q, respectively. Finger death signal (f_death) is generated in the lock detector in conjunction with the searcher when PN-code acquisition at a given finger is lost. For re-locking of PN-code acquisition when the finger death signal (f_death) occur, f_reset is generated from the lock-detector and the weight vector computing part (130) is in turn reset such that the weight vector computing part (130) is started from initial stage.

As mentioned earlier, it is extremely important to provide exact timing information, i.e., synchronization between the received signal and local PN-code, for accurate demodulation of CDMA data. Therefore, the tracking part (180) generates the frame tracking information (f_trk) by observing energy difference between early and late descrambling of received signal and local PN-code. The difference in time lag of early and late correlation is preset with proper amount. Early and late time information will be denoted as first and second sync time information, respectively, in this document.

In the tracking part (180), it has been found from many computer simulations that the first synch time information is to be 0.2 or 0.5 chips duration earlier than the frame timing information (f_timing) while the second synch time information is to be 0.2 or 0.5 chip later.

In the tracking part (180), the timing information is produced from difference between two energies which are obtained by integrating results of the early and late descrambling wherein the first and second synch time information are used, respectively. Or, in the tracking part, the energies corresponding too early and late descrambling can also be generated by squaring weighted sums between the weight vector and descrambled signal obtained through the early and late descrambling procedure, respectively. Then, the frame time information can be obtained from difference between the two energies. Another method in the tracking part is that the energies corresponding too early and late descrambling can also be generated by squaring integration of weighted sums between the weight vector and the descrambled signal obtained through the early and late descrambling procedure, respectively.

For obtaining the frame tracking information (f_trk) in the tracking part (180), some additional processing may also be included in addition to computing the difference of energies of early and late correlations such as low pass filtering of the energy difference.

In a desirable example of this invention, DLL (Digital Lock Loop) has been adopted at each the finger for fine-tracking to countermeasure the small changes in path delay during communication. Through many computer simulations, it has been found that the frame time information (f_timing) is to be changed by ⅓-⅛ chip earlier or later than current value.

For easy explanation of techniques disclosed by this invention, we take demodulation apparatus of CDMA2000 as an example of applying the finger.

Figure 2A:
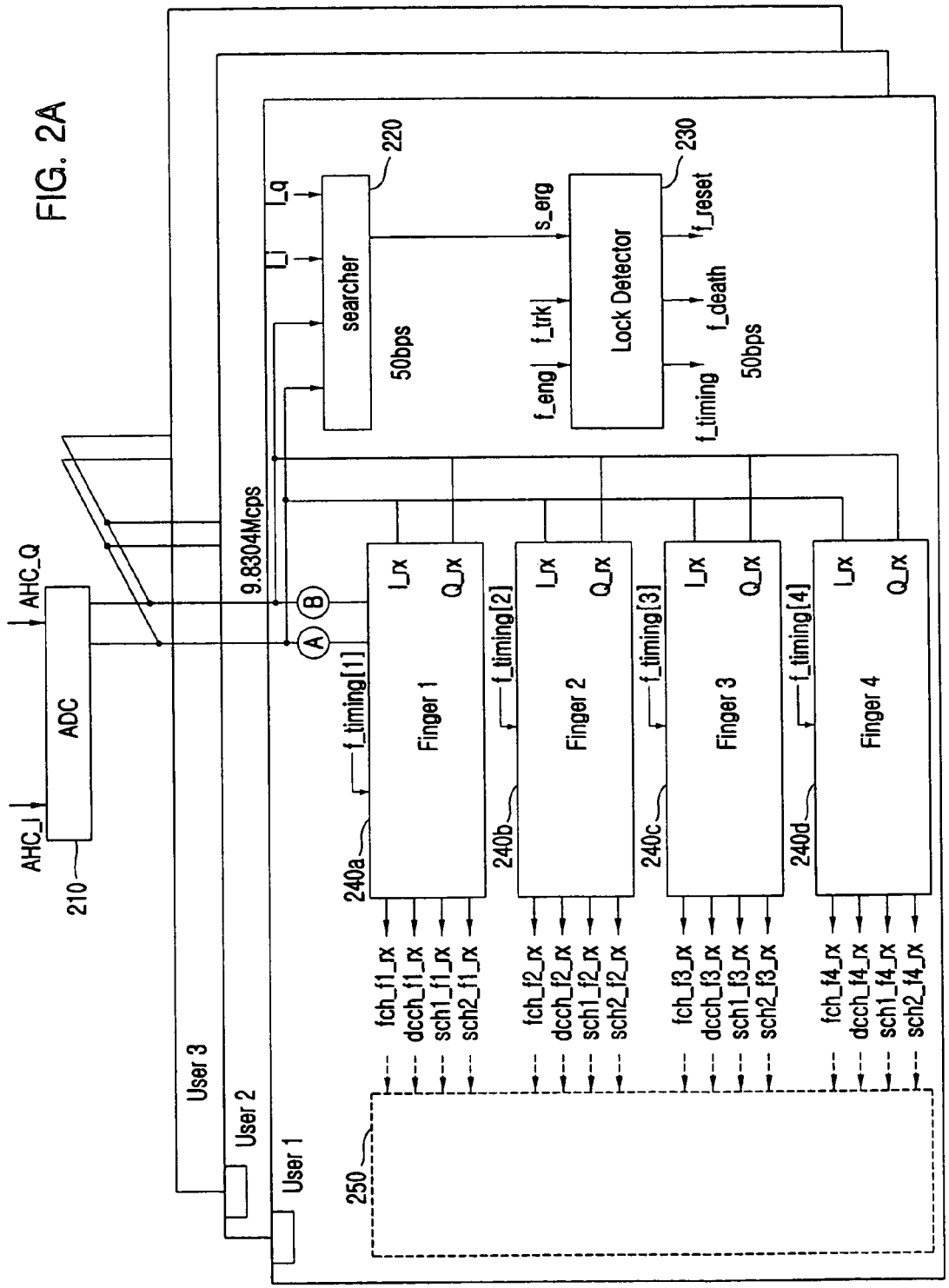
FIG. 2 illustrates one example of a block-diagram of a demodulation apparatus that is equipped with the fingers shown in FIG. 1.
Figure 2B:
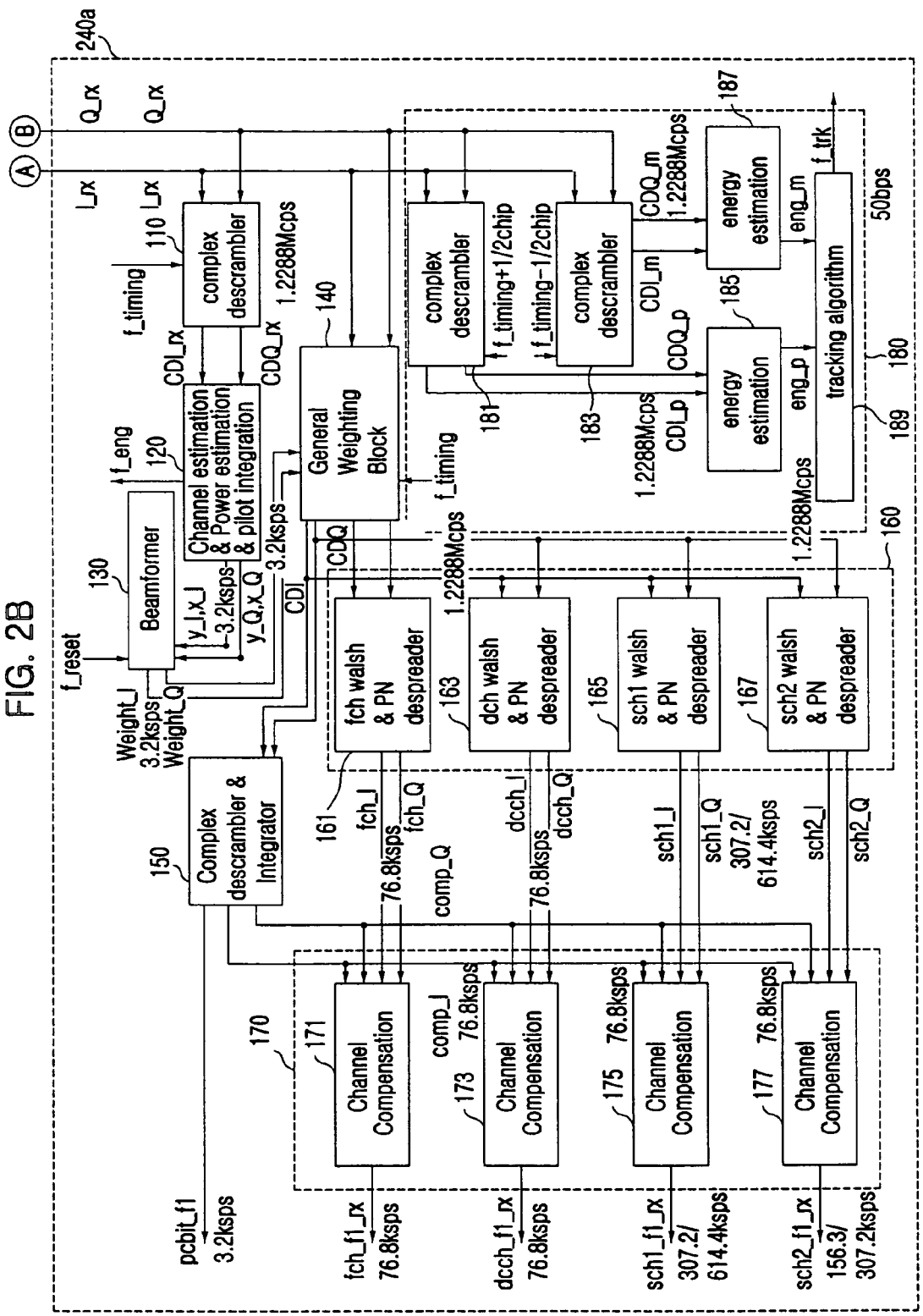

Referring to FIG. 1 that shows one desirable example of the finger structure, the descrambling part (110) performs complex descrambling the received signal of which In-phase and Quadrature component has been respectively scrambled with corresponding PN-code by correlating it with the PN-code using frame timing information (f_timing) provided from the lock detector shown in FIG. 2.

The pilot signal generating part #1 (120) retrieves the pilot signal by integrating the descrambled data fed from the descrambling part (110) for the weight vector computing part (130) to use it as input together with output of the descrambling part (110). Output of the pilot signal generating part #1 (120) and descrambling part (110) will be denoted as y-vector and x-vector, respectively, in this document. Depending on the arithmetic procedure of computing the weight vector in the weight vector computing part (130), only one of x- or y-vector can be used instead of both of them.

Furthermore, the descrambling part (110) and pilot signal generating part #1 (120) might also be unified as a single part such that the two operations can be achieved in the single part.

The weight vector computing part (130) produces the weight vector using the x-vector and y-vector provided from the descrambling part (110) and pilot signal generating part #1 (120), respectively. In addition, the weight vector computing part (130) can also include weight vector initializing part as well. Furthermore, the weight vector computing part (130) can also be equipped with additional part of receiving the frame reset signal (f_reset) from the lock detector in order to reset the weight vector into initial state.

The general weighting part (140) generates the array output in the chip-rate by multiplying the received signal by the weight vector and summing up results of the multiplications in such a way that the inter-element phase difference between antenna elements to be compensated.

The pilot signal generating part #2 (150) retrieves the pilot signal that is to be used to compensate the phase distortion due to the path delay by integrating multiplication of PN-code and the array output obtained from the general weighting part (140). The pilot signal generating part #2 also detects power control bit and provides frame energy signal (f_eng) to the lock-detector such that current value of the frame energy be transmitted to the lock detector.

Furthermore, in a desirable example of this invention, the Walsh despreading part (160) comprises following parts: Fundamental channel (which will be referred to as "FCH" for simplicity) despreading part (161) for retrieving data transmitted through the FCH by descrambling the array output through multiplication of the array output and the PN-code and further multiplying result of the descrambling of the array output to correlate it with the Walsh code corresponding to the FCH of length 16 chips such that symbol rate of resultant data to be reduced by 1/16 chip-rate (76.8 kbps); Dedicated control channel (which will be referred to as DCCH for simplicity) despreading part (163) for retrieving data transmitted through DCCH by descrambling the array output through multiplication of the array output and the PN-code and further multiplying result of the descrambling of the array output to correlate it the Walsh code corresponding to the DCCH of length 16 chips such that symbol rate of resultant data to be reduced by 1/16 chip-rate (76.8 kbps); Supplemental channel #1 (which will be referred to as SCH#1 for simplicity) despreading part (165) for retrieving data transmitted through SCH#1 by descrambling the array output through multiplication of the array output and the PN-code and further multiplying result of the descrambling of the array output to correlate it with the Walsh code corresponding to the SCH#1 of length 16, 8, 4, or 2 chips such that symbol rate of resultant data to be reduced by 1/16, ⅛, ¼, or ½ chip-rate (76.8 kbps, 153.6 ksps, 307.2 ksps, or 614.4 ksps); Supplemental channel #2 (which will be referred to as SCH#2 for simplicity) despreading part (167) for retrieving data transmitted through SCH#2 by descrambling the array output through multiplication of the array output and the PN-code and further multiplying result of the descrambling of the array output to correlate it with the Walsh code corresponding to the SCH#2 of length 16, 8, 4, or 2 chips such that symbol rate of resultant data to be reduced by 1/16, ⅛, ¼, or ½ chip-rate (76.8 kbps, 153.6 ksps, 307.2 ksps, or 614.4 ksps). In the Walsh despreading part, procedure of the descrambling and that of correlating with corresponding Walsh code can be performed in a single procedure using multiplication of the Walsh code and PN-code on chip-by-chip basis.

The phase distortion compensating part (170) compensates the phase distortion due to the path delay associated with each of traffic channels separately such that the phase distortion compensating part (170) consists of plural the phase distortion compensating parts. For example, there are four the phase distortion compensating parts (171), (173), (175), and (177) in case of CDMA2000 1X system.

The tracking part (180) which provides exact chip synchronization through the fine-tuning of PN-code acquisition comprises following parts: descrambling part #1 (181) for multiplying the received signal with the PN-code of ½ chip advanced time to f_timing (this descrambling part will be denoted as "early descrambling part" in this document); descrambling part #2 (183) for multiplying the received signal with the PN-code of ½ chip retarded time to f_timing (this descrambling part will be denoted as "late descrambling part" in this document); correlation energy generating parts (185, 187) for providing the correlation energies by integrating results of the descrambling part #1 and descrambling part #2 (181, 183), respectively; and tracking information (f_trk) generating part (189) for providing the tracking information (f_trk) by comparing magnitudes of results of the correlation energy generating parts (185, 187). In the descrambling parts, the advanced and retarded time to the f_timing in early and late descrambling part, respectively, can be some other values than ½. In general, it has been found that early and late time can be selected in range of 0.2 to 0.5.

In the tracking information (f_trk) generating part (189), the tracking information (f_trk) is obtained by comparing the integration values provided from the correlation energy generating parts (185, 187) which are associated with the early and late descrambling part, respectively. Voltage controlled oscillator (VCO) can be used to produce the tracking information (f_trk).

As described above in detail, the finger of CDMA receiver with a main emphasis on the application to smart antenna system makes it possible to track each user and provide high speed wide-band communication by weighting received data carried in the traffic channels in chip-rate with the weights computed from the pilot channel in the reverse link.

Although there are four the fingers assigned for each user in the demodulation apparatus of the smart antenna system in a desirable example in this document, it is clear to any normal people with common knowledge that number of the fingers assigned to each user can be set to any proper number in a given circumstance.

FIG. 2 illustrates an example of applications of the finger disclosed in this invention shown in FIG. 1 to the demodulation apparatus in mobile communication system. It is clear that the finger disclosed in this invention can be applied to the demodulation apparatus operating in any other kind of communication environments. The demodulation apparatus shown in FIG. 2A comprises the ADC (210), the searcher (220), the lock detector (230), the fingers (240A-240D), and received signal processing part (250).

As shown in FIG. 2A, the demodulation apparatus applying the finger operating in chip-rate comprises the ADC (210) for generating the received signal through procedure of oversampling received analog signal after the frequency-down conversion and the searcher (220) for transmitting the searcher-energy (or, equivalently, the correlation energy) that exceeds preset threshold value to lock detector (230) while the searcher-energy is computed through correlation procedure between output of the ADC (210) and the PN-code corresponding to the pilot channel.

In addition, the demodulation apparatus applying the finger operating in chip-rate also comprises the lock detector (230) for generating signals needed for accurate frame synchronization such as the frame reset (f_reset), the frame timing (f_timing), the frame death (f_death) information using the correlation energy provided from the searcher (220). As described already in previous explanations, the demodulation apparatus comprises at least one the finger (240A-240D), which also comprises the descrambling part (110), the pilot signal generating part #1 (120), the weight vector computing part (130), the general weighting part (140), the pilot signal generating part #2 (150), the Wash despreading part (160), the phase distortion compensating part (170), and the tracking part (180) (which is also denoted as "tracker" in this document), and the received signal processing part (250) which performs conventional functions of receiving apparatus such as signal combiner, de-interleaver, soft-decision performer, Viterbi decoder, CRC (cyclic redundancy code) checker, turbo decoder, and/or other kinds of conventional signal receiving, estimating, and/or detecting parts.

Figure 2C:
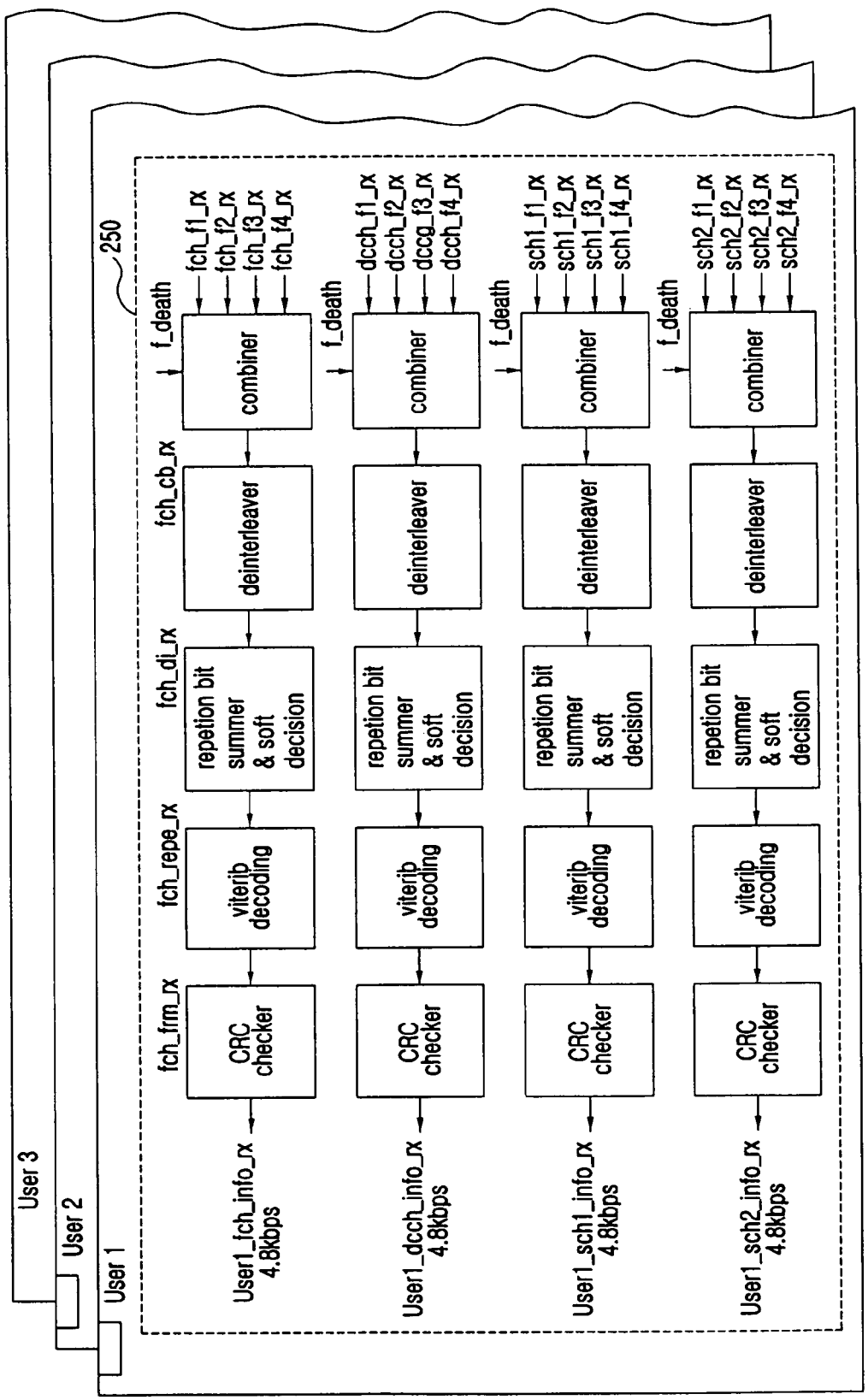

FIG. 2C illustrates one example of a block-diagram of the received signal processing part (250) which is a part of the demodulation apparatus to be connected to the finger shown in FIG. 1 operating in one example of CDMA mobile communication systems. FIG. 2A illustrates how the finger (240A-240D) shown in FIG. 1 is connected to the received signal processing part (250) shown in FIG. 2C. As shown in FIG. 2C, the received signal processing part (250) comprises the signal combiner for combining each of the traffic signals fed from plural the fingers, de-interleaver for rearranging received data back to their original order, soft decision performer for providing the soft decision of the de-interleaved data, the Viterbi decoder for decoding convolutionally encoded data, CRC checker for detecting frame error, etc, of which structure and functions are so conventional that detailed explanations are omitted in this document.

Furthermore, technology that can appropriately be applied to enhance performance of the searcher (220) without computing the weights has already been filed as a Korean patent application No. 2001-20971 dated Apr. 18, 2001.

From here after, more detailed explanations about the finger are provided using related figures.

Figure 3:
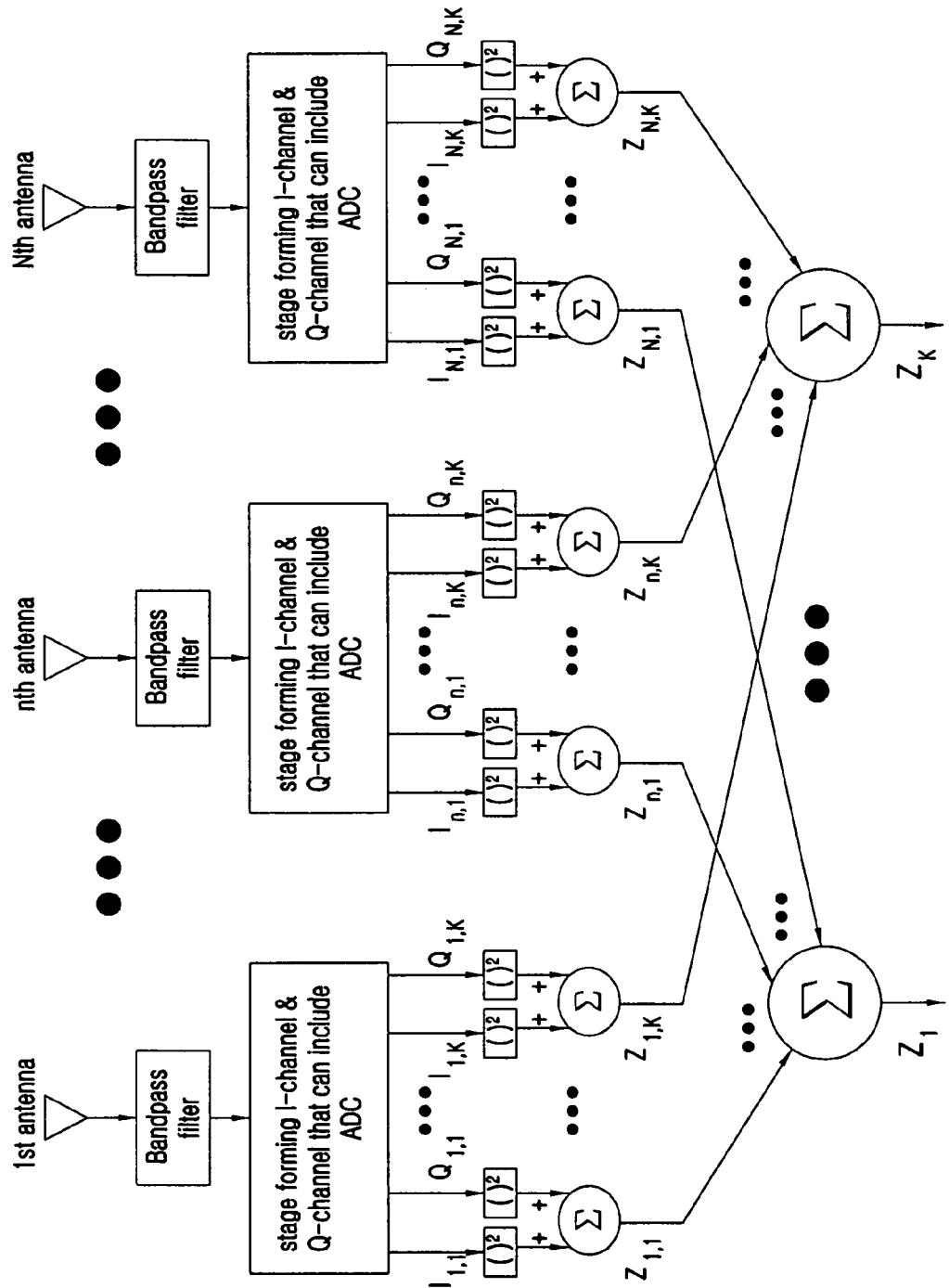
FIG. 3 describes concept of technology, which is referred to as "phase diversity technology," used in a searcher and a tracker disclosed in this invention.

FIG. 3 illustrates a conceptual block diagram for explaining concept of the phase diversity technology that is applied to the searcher (220). For easier explanation, let's take an example from demodulation procedure of received data at n-th antenna element.

The phase diversity that has been applied to the finger disclosed in this invention is explained in more detail from here using related figures that have been obtained through various computer simulations. Suppose there are M waves impinging upon the smart antenna system with distinct incident angles. This corresponds to the case of M users transmitting signals to the smart antenna system assuming no multipath. However, in multipath environment, the number of users is a lot less than M. In either case, the phase difference between two antenna elements in the smart antenna system due to a signal propagated through a single path, say, l-th path, can be written as $\phi(\theta, d)$, a function of the incident angle $\theta_l$ and the element separation d. Therefore, $$\text{Phase difference} = \phi(\theta_l, d) \qquad \text{[EQUATION 1]}$$

Suppose the l-th path carries desired signal, and the first antenna element is reference element. Then, the desired and undesired part of I- and O-component of the received signal at the k-th branch of the n-th antenna element, denoted by $I_{n,k}$ and $Q_{n,k}$, respectively, can be written as $$I_{n,k} = S_{l,k}\cos[\phi_l + (n-1)\varphi(\theta_l, d)] + \sum_{m=1, m\neq l}^{M} S_{m,k}\cos[\phi_m + (n-1)\varphi(\theta_m, d)] \qquad \text{[EQUATION 2]}$$

$$Q_{n,k} = S_{l,k}\sin[\phi_l + (n-1)\varphi(\theta_l, d)] + \sum_{m=1, m\neq l}^{M} S_{m,k}\sin[\phi_m + (n-1)\varphi(\theta_m, d)] \qquad \text{[EQUATION 3]}$$

where $\phi_m$ is carrier phase delay associated with the m-th path, and $S_{m,k}$ is the amplitude of the received signal at the k-th branch of the reference antenna element propagated through the m-th path. Note that the first terms of equation (2) and (3) are the desired signals, and the second terms are the interferences since the l-th path carries the desired signal. The noise terms are ignored for the sake of simplicity. If incident angles $\{\theta_m\}$ are assumed to be mutually independent random variables with uniform distribution, then, for sufficiently large M, the interfering terms, i.e., the second terms of equation (2) and (3), are mutually independent Gaussian random variables. Then, equation (2) and (3) can be rewritten as $$I_{n,k} = G[S_{l,k}\cos(\theta_{n,l}), \sigma^2] \qquad \text{[EQUATION 4]}$$

$$Q_{n,k} = G[S_{l,k}\sin(\theta_{n,l}), \sigma^2] \qquad \text{[EQUATION 5]}$$

where $G[\mu, \sigma^2]$ denotes a Gaussian random variable with mean $\mu$ and variance $\sigma^2$ where the variance is determined by the sum of the interferers' power measured at receiving side, and $\theta_{n,l} = \phi_l + (n-1)\phi(\theta_l, d)$.

The correlation energy is obtained from squared sum of I- and Q-components for the non-coherent envelope detection. Denoting the correlation energy associated with the k-th branch by $Z_k$, it is claimed in the "Phase diversity technology" (a patent in pending as of 20971 in Korea dated as on Apr. 18, 2001) that each of the correlation energy should be obtained from the sum of all the corresponding I- and Q-components obtained from each antenna element, i.e., $$Z_k = \sum_{n=1}^{N} [I_{n,k}^2 + Q_{n,k}^2] \quad \text{for } k = 1, 2, \ldots, K \qquad \text{[EQUATION 6]}$$

Probability density function (PDF) of the correlation energy $Z_k$ can be written as $$p_{Z_k}(\alpha) = \frac{(\alpha/\sigma^2 b_k)^{(N-1)/2}}{2\sigma^2} e^{-\frac{1}{2}(b_k + \alpha/\sigma^2)} \quad \text{for } \alpha \geq 0 \qquad \text{[EQUATION 7]}$$

$$I_{N-1}\left(\sqrt{\frac{b_k \alpha}{\sigma^2}}\right),$$

$$= 0, \qquad \text{for } \alpha < 0$$

where the non-centrality parameter $$b_k = N \frac{S_k^2}{\sigma^2}$$

and $I_{N-1}(\circ)$ is the modified Bessel function of the first kind with order $N-1$. Note that when $S_k=0$, $b_k$ becomes zero. This means that when the amplitude of the desired signal is zero at the k-th branch. Therefore, when there is no the desired signal at the k-th branch, the correlation energy $Z_k$ is a central chi-squared random variable. For this case, the PDF of the correlation energy $Z_k$ becomes, $$p_{Z_k}(\alpha) = \frac{1}{(\sigma^2)^N 2^N \Gamma(N)} \alpha^{(N-1)} e^{-\alpha/2\sigma^2} \qquad \text{[EQUATION 8]}$$

where $\Gamma(\circ)$ denotes Gamma function.

The mean of the central chi-square random variable is $2N\sigma^2$ and its variance is $4N\sigma^4$. For the case of non-central Chi-square, the mean is $N(2\sigma^2+S^2)$ and the variance is $4N\sigma^2 (\sigma^2+S^2)$. Both the mean and variance of the correlation energy $Z_k$ increase linearly as the number of antenna elements increases. This indicates that performance of the non-coherent detection improves linearly as the number of antenna elements in the smart antenna system increases. Consequently, the phase diversity technique, through the correlation energy $Z_k$, increases the signal-to-interference ratio (SIR) by nearly N-times where N is the number of antenna elements in the smart antenna system. It is important that there is no the weight computation involved in achieving the phase diversity gain.

Figure 4:
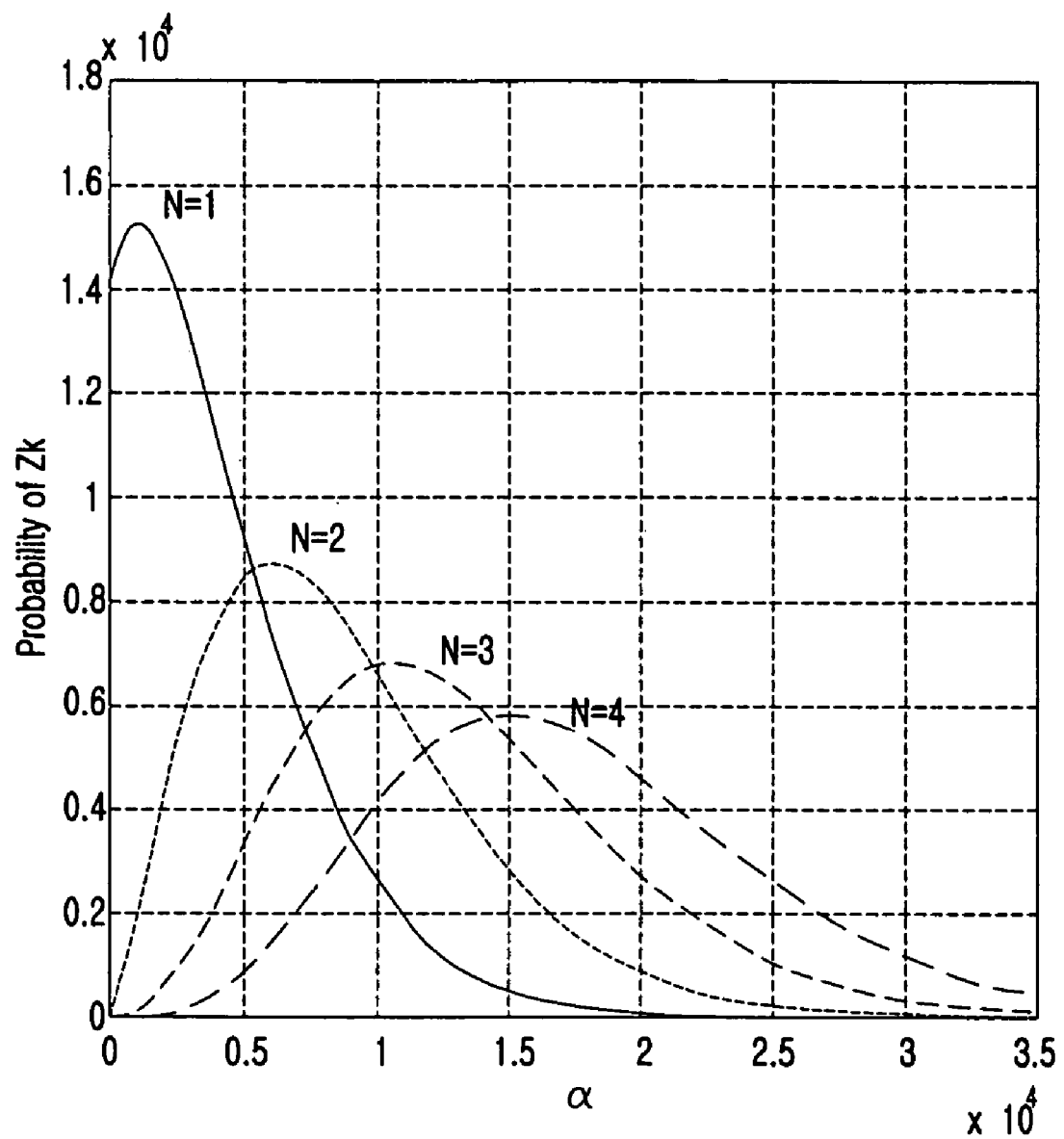
FIG. 4 illustrates performance of a phase diversity technology when $S_{l,k}$=50 and $\sigma^2$=1000. It can be observed that distribution of energy ($Z_{l,k}$) is more concentrated as number of antenna is increased.
Figure 5:
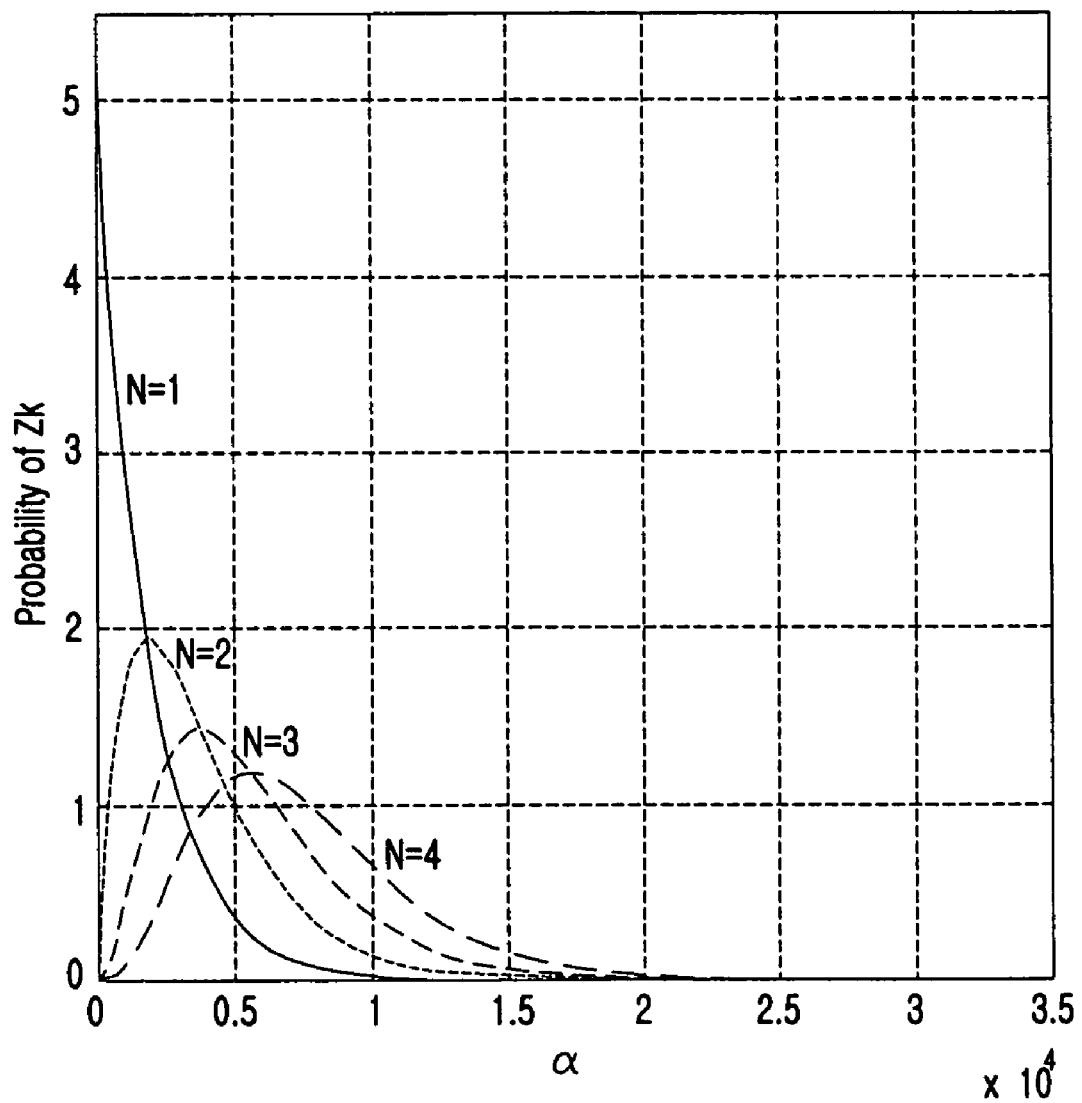
FIG. 5 illustrates performance of the phase diversity technology when $S_{l,k}$=0 (no desired signal) and $\sigma^2$=1000. It can be observed that distribution of energy ($Z_{l,k}$) is more concentrated as number of antenna is increased.
Figure 6:
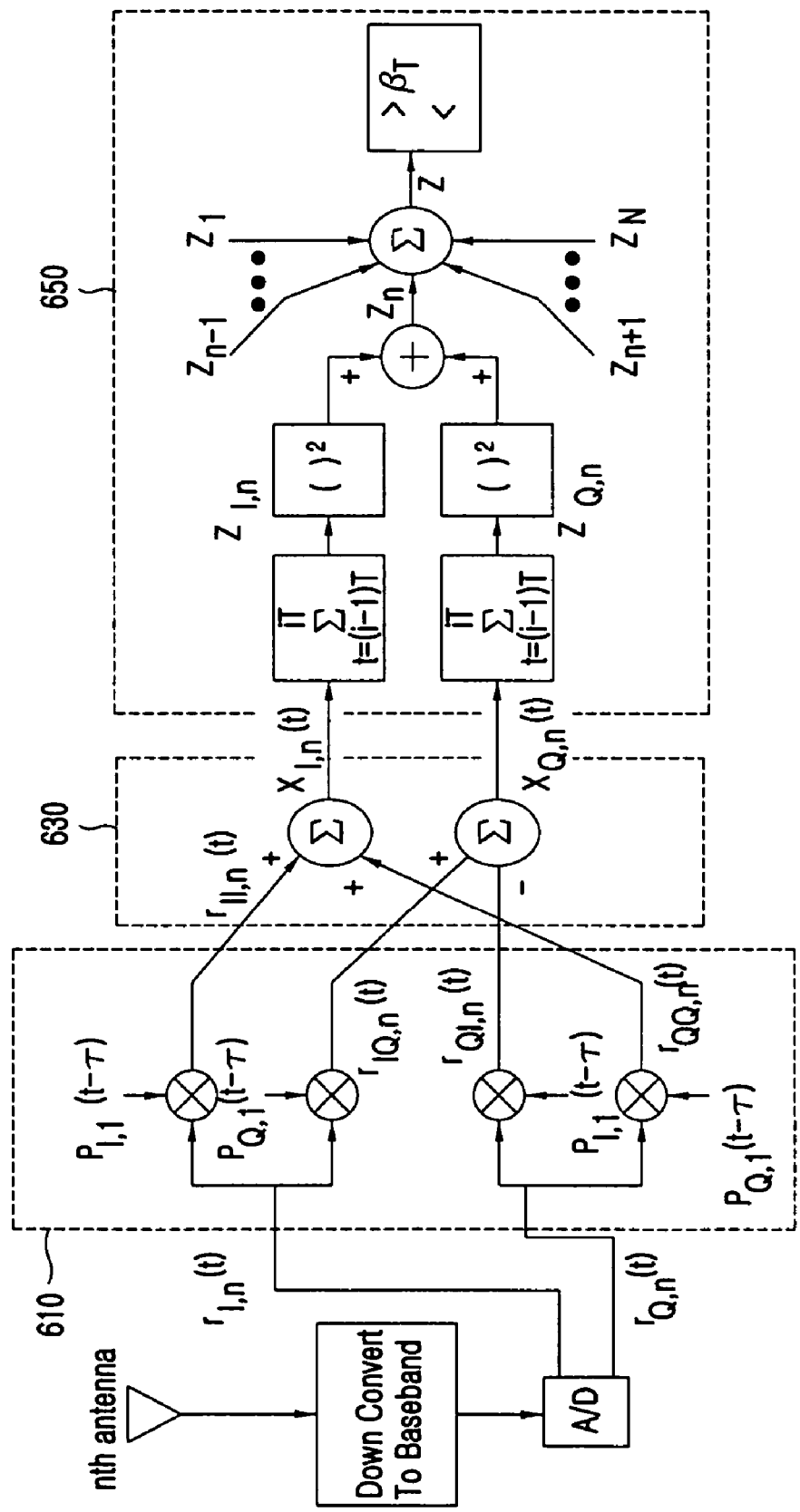
FIG. 6 illustrates an example of application of the phase diversity to the searcher operating in reverse link of CDMA mobile communication system.

FIG. 4 and FIG. 5 show the probability distribution of correlation energy $Z_k$ as the number of antenna elements varies from 1 to 4. FIG. 4 shows the case of $S_k=50$, $\sigma^2=1000$, which means there exists the desired signal; whereas FIG. 5 shows the case of $S_k=0$, $\sigma^2=1000$, which means there is no the desired signal present. FIG. 6 illustrates a block diagram of the searcher applied in an example of CDMA system incorporating the phase diversity technique. In FIG. 6, $P_I(t-\tau)$ and $P_Q(t-\tau)$ denote the I- and Q-component, respectively, of the PN-code corresponding to the desired signal impinging upon the smart antenna system through the l-th path. Objective of the PN-code acquisition is to find the timing information, more specifically, value for time lag $\tau$ in $P_I(t-\tau)$ and $P_Q(t-\tau)$ which provides peak value in the correlation. As subscript k is deleted, the correlation energy Z can be rewritten as $$Z = \sum_{n=1}^{N} [I_n^2 + Q_n^2]. \qquad \text{[EQUATION 9]}$$

Considering following two hypotheses;
$H_1$: acquisition is achieved
$H_0$: acquisition is not achieved
then, conditional probabilities under these hypotheses are $$p_z(\alpha | H_0) = \frac{1}{(\sigma^2)^N 2^N \Gamma(N)} \alpha^{(N-1)} e^{-\alpha/2\sigma^2}, \qquad \text{[EQUATION 10]}$$

$$p_z(\alpha | H_1) = \frac{(\alpha/\sigma^2 b)^{(N-1)/2}}{2\sigma^2} e^{-\frac{1}{2}(b+\alpha/\sigma^2)} I_{N-1}\left(\sqrt{\frac{b\alpha}{\sigma^2}}\right), \qquad \text{[EQUATION 11]}$$

where $\sigma^2=2TM$ in (10), $\sigma^2=2T(M-1)$ in (11), and $b=2TM/(M-0.5)$ with T being the integration interval in computing the correlation energy. From (10) and (11), probabilities of detection and false alarm in a single synchronization test can respectively be given as $$P_F = Pr\{Z > \beta_T | H_0\} \text{ with } \sigma^2 = 2TM \qquad \text{[EQUATION 12]}$$

$$= \int_{\beta_T}^{\infty} \frac{1}{(\sigma^2)^N 2^N \Gamma(N)} \alpha^{(N-1)} e^{-\alpha/2\sigma^2} d\alpha$$

$$P_D = Pr\{Z > \beta_T | H_1\} \text{ with } \sigma^2 = 2T(M-1) \qquad \text{[EQUATION 13]}$$

$$= \int_{\beta_T}^{\infty} \frac{(\alpha/\sigma^2 b)^{(N-1)/2}}{2\sigma^2} e^{-\frac{1}{2}(b+\alpha/\sigma^2)} I_{N-1}\left(\sqrt{\frac{b\alpha}{\sigma^2}}\right) d\alpha.$$

Figure 7:
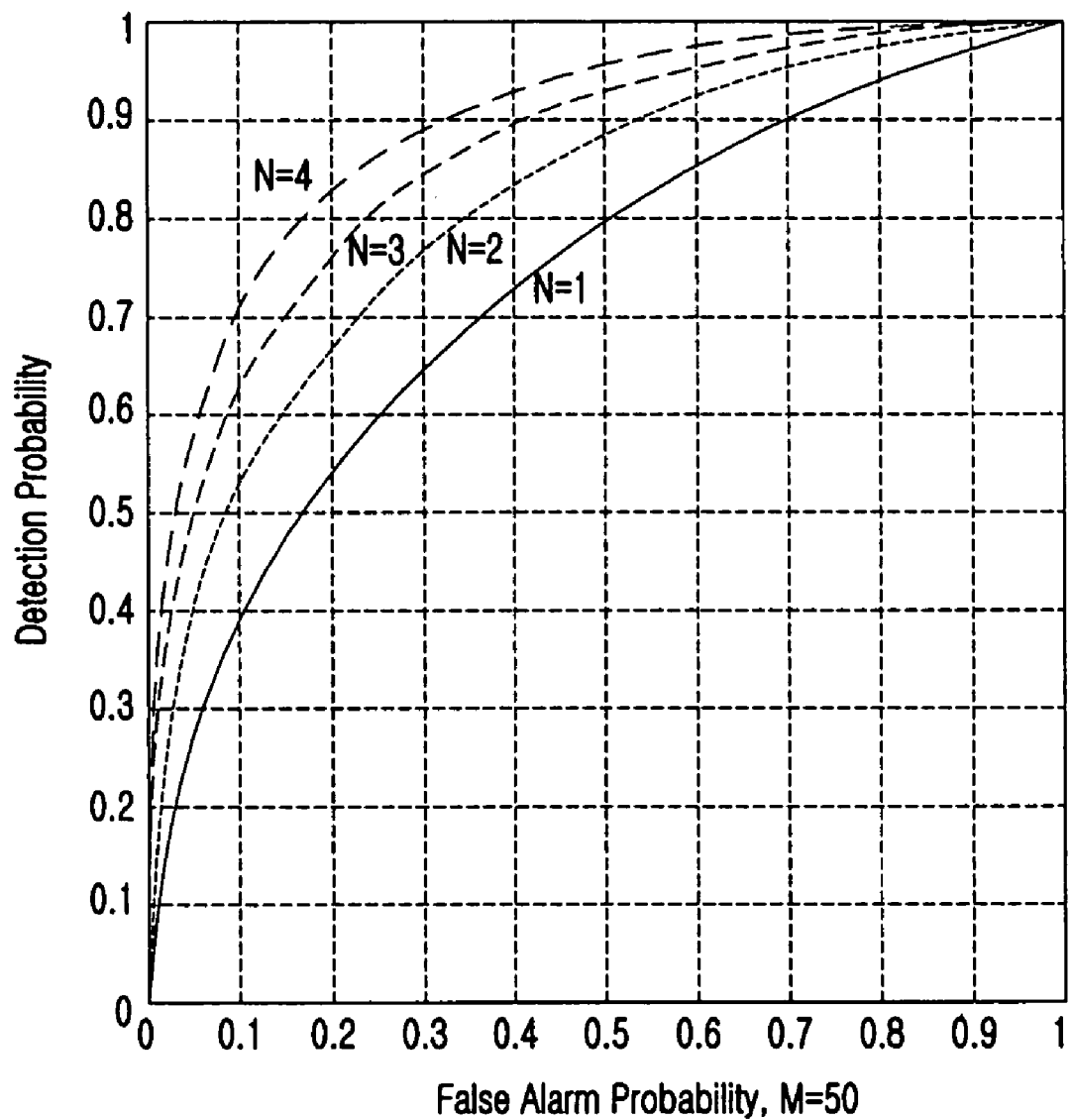
FIG. 7 illustrates theoretical performance of detection probability ($P_D$) and false alarm probability ($P_F$) when processing gain (PG), i.e., period for the pilot channel integration, is 64 and number of interferers is 50.
Figure 8:
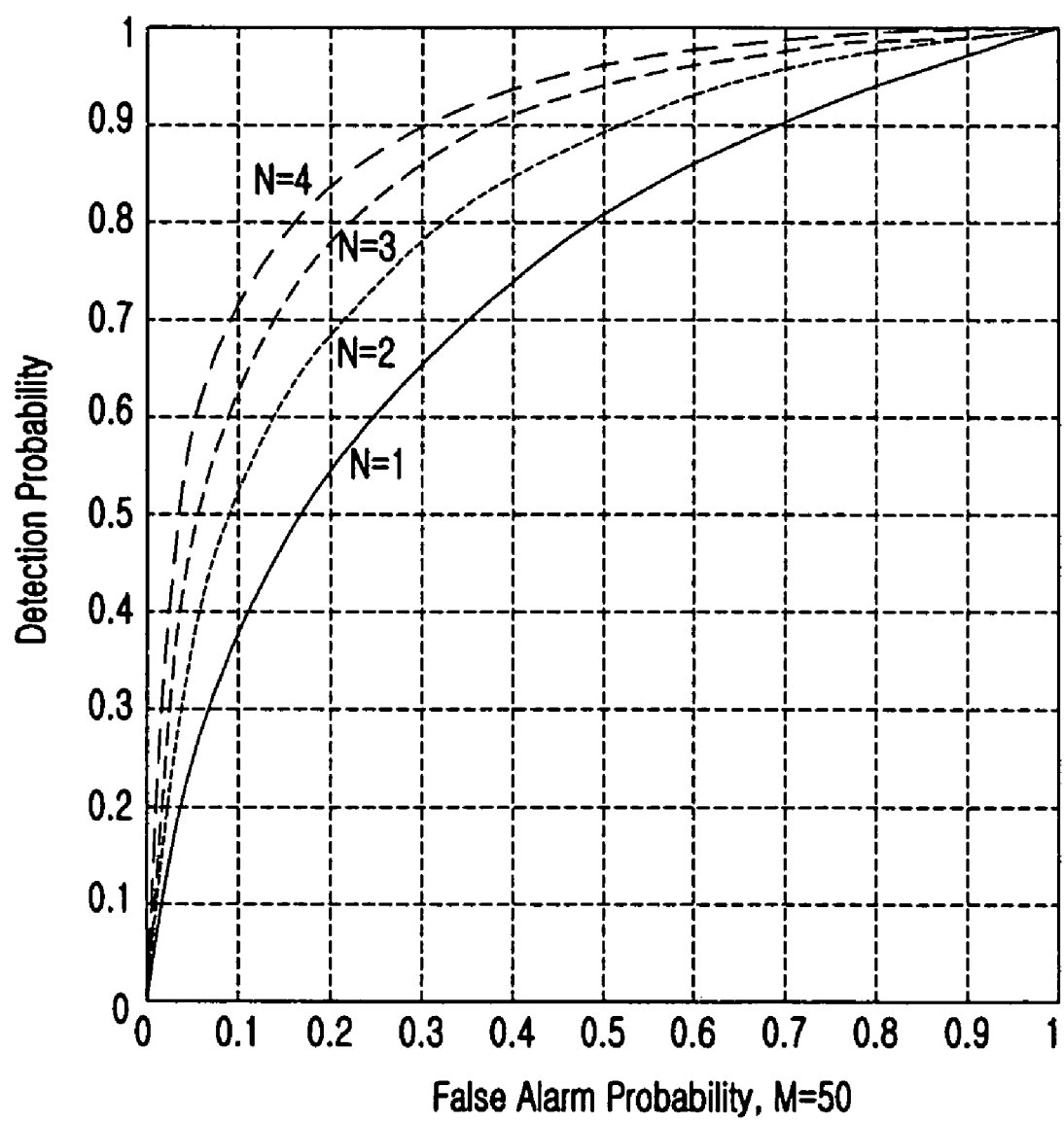
FIG. 8 illustrates simulation performance of detection probability and false alarm probability when processing gain (PG), i.e., period for the pilot channel integration, is 64 and number of interferers is 50.
Figure 9:
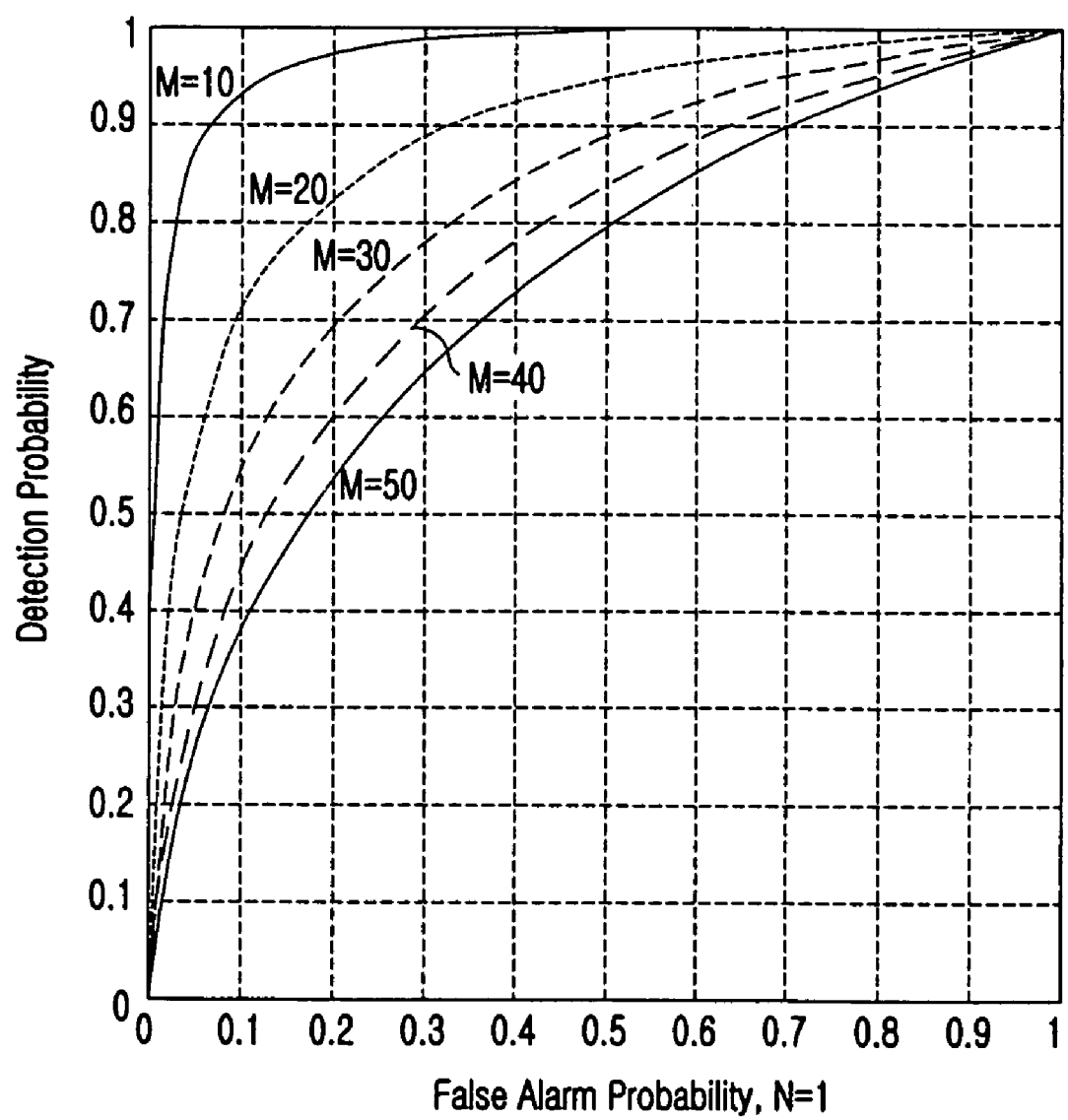
FIG. 9 illustrates theoretical values for $P_F$ and $P_D$ when number of antenna elements is one.
Figure 10:
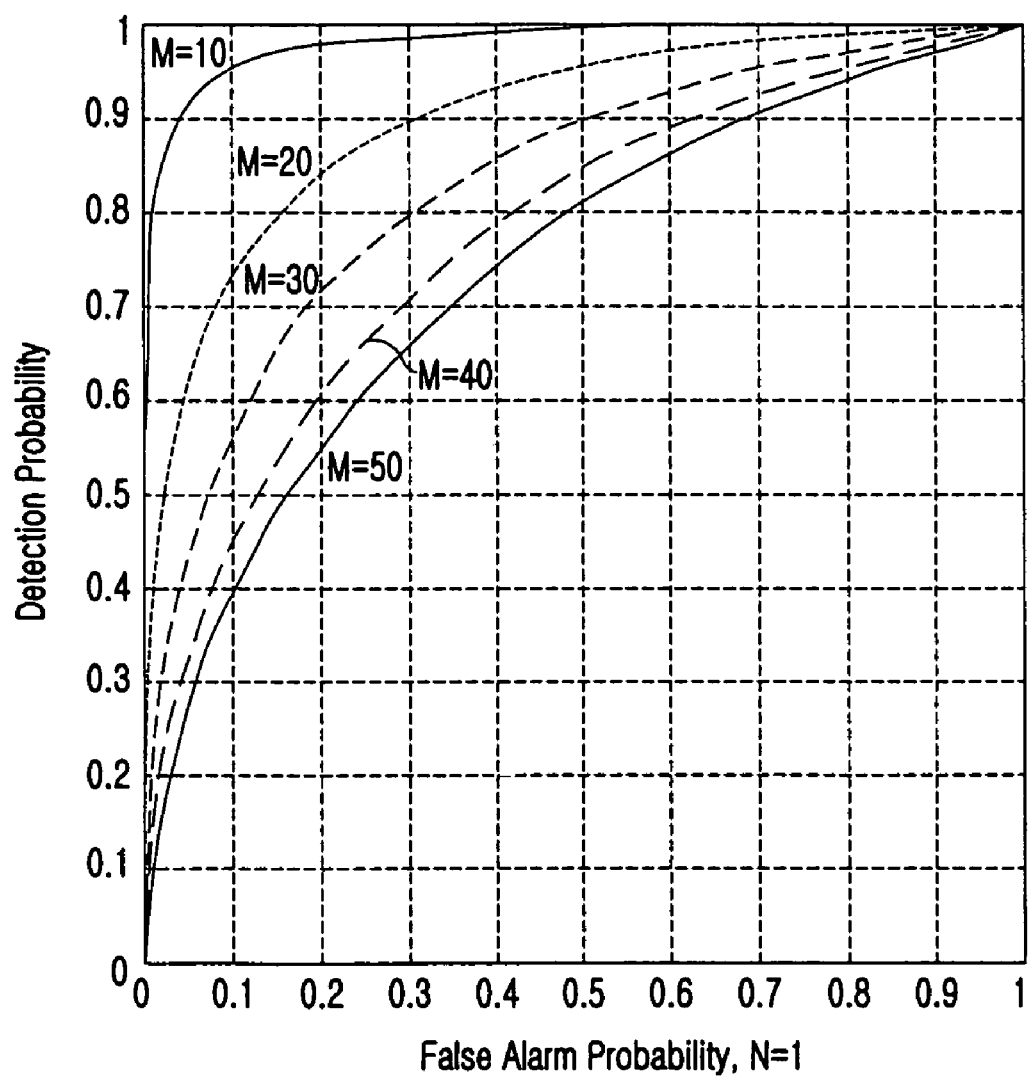
FIG. 10 illustrates simulation values for $P_F$ and $P_D$ when number of antenna elements is one.

Solving equation (12) and (13) for $\beta_T$, theoretical values for the detection probability and false alarm probability can be obtained. FIG. 7 shows the theoretical values of the detection and false alarm probabilities obtained from equation (12) and (13), and FIG. 8 shows corresponding results for real situation obtained from Monte Carlo simulation. In FIG. 7 and FIG. 8, the integration interval T has been set in such a way that the number of chips in the integration interval becomes 64. It means that processing gain of 64 has been exploited during the searching procedure. Number of the interferers has been set to be 50. FIGS. 9 and 10 show the detection probability and false alarm probability for a single antenna system as a function of number of the interferers. It is worthwhile to note that the performance of a searcher is drastically enhanced by the phase diversity technology. For instance, as shown in FIG. 8, the smart antenna system with 4 antenna elements incorporating the phase diversity technique can tolerate 50 of the interferers while conventional one-antenna system can tolerate only 20 of the interfering users to maintain comparable searching performance. This implies that communication capacity is increased by nearly 2.5 times for the PN-code acquisition. This improvement is due to 4 dB gain in SIR through the phase diversity technique in the smart antenna system of 4 antenna elements.

The main contribution of the phase diversity technology is that the smart antenna system can be made to outperform normal one-antenna systems even from initial stage when optimal the weight vector is not available.

The demodulation apparatus with above-described structures and functions makes it possible in the smart antenna system that each user be tracked accurately and high speed wide-band communication be provided by weighting the received data carried in the traffic channels in symbol-rate with the weights computed from the pilot channel in the reverse link.

The demodulation apparatus disclosed is for each user's channel card. As an example, the channel card with four the finger at each user's channel card has been introduced in this document. However, it is clear to any people of this field that number of the fingers to be assigned at each user can be set with any proper selection depending on given signal environment and/or convenience.

Figure 11:
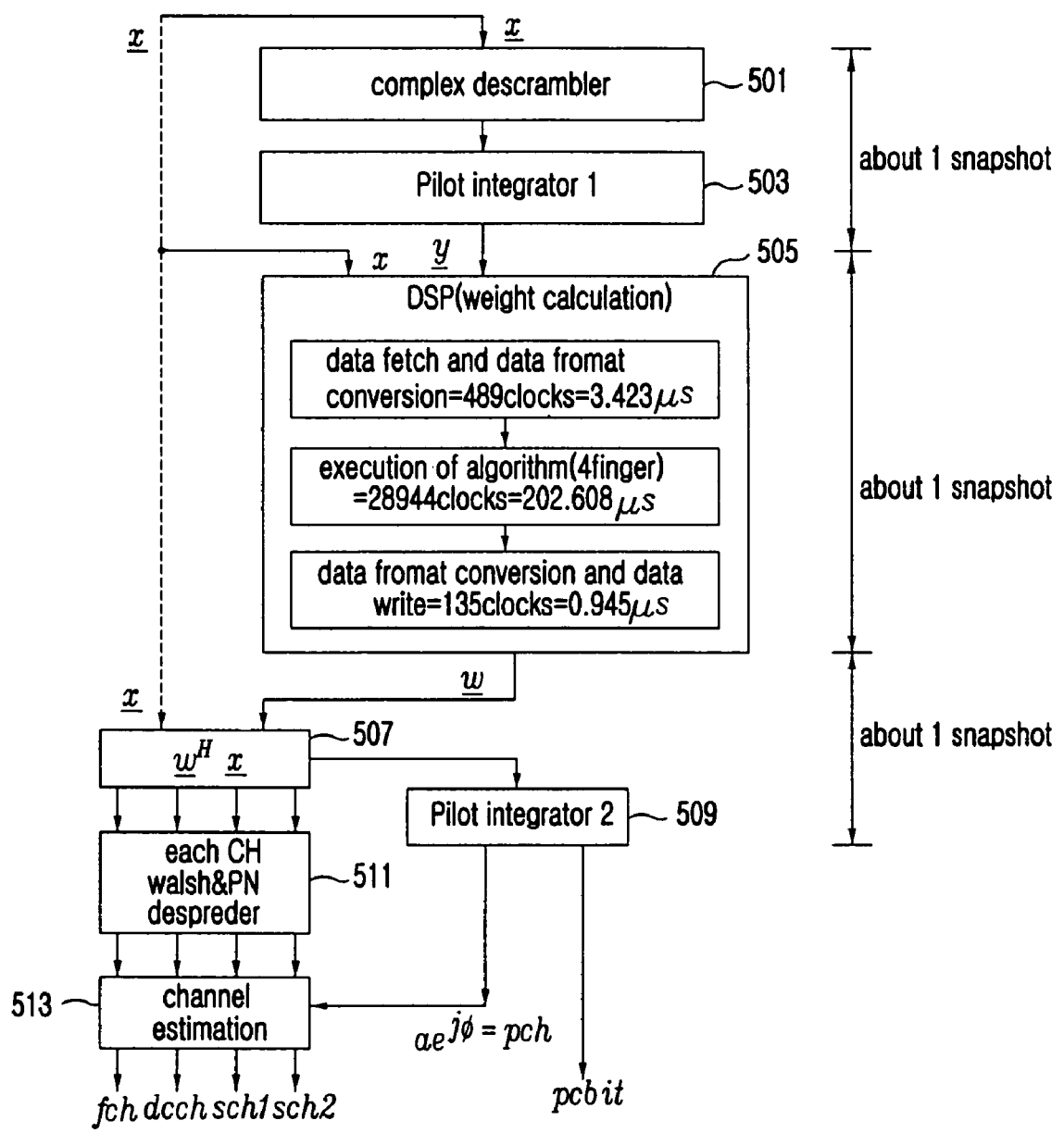
FIG. 11 illustrates a flow-chart of a desirable example of the demodulation method using the finger operating in chip-rate disclosed in this invention.
Figure 12:
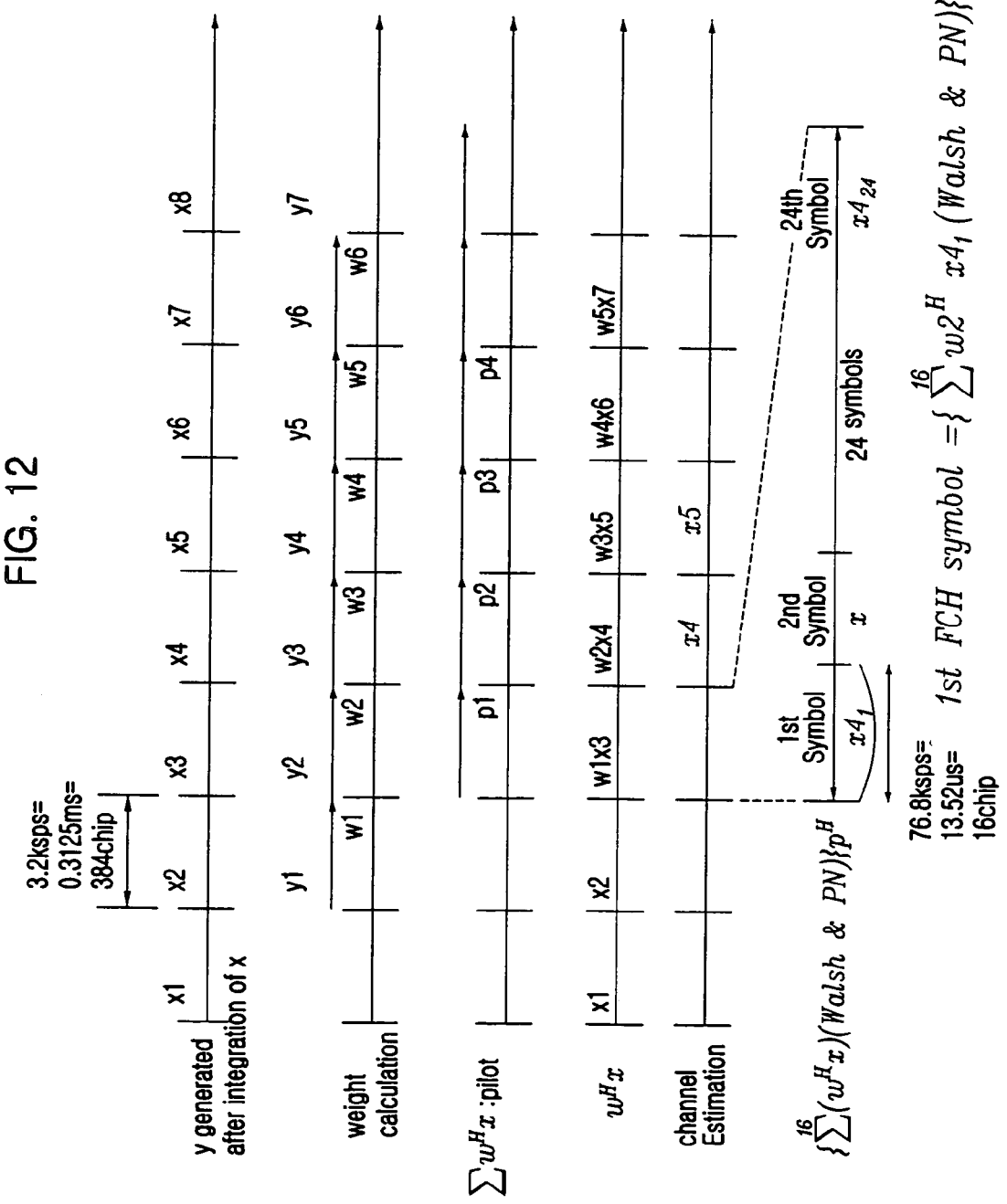
FIG. 12 illustrates how much delay is encountered in procedure of chip-rate weighting itself.

FIG. 11 illustrates a flow chart of the demodulation method using the finger in which the received signal are weighted in the symbol-rate as described in this invention. FIG. 12 illustrates how much processing delay is encountered in the demodulation procedure adopting the finger that operates in the symbol-rate.

According to FIG. 11, the demodulation method disclosed in this invention can be explained as follows: the received signal is descrambled in the complex descrambler (501) using the frame timing information (f_timing) by multiplying the received signal by the PN-code. Then, the pilot signal is produced by integrating (503) the descrambled data in order to use as input signal for computing the weight vector. The beam-forming parameter, i.e., the weight vector, is computed (507) from the descrambled received signal and the pilot signal. Computing time required for obtaining the weight vector is dependent upon processor and algorithm used in the weight vector computing part, although it has been written as being a single snapshot period in example shown in this invention.

After the received signal is multiplied by the weight vector in the pilot weighting part, results of multiplications are summed up to produce weighted pilot signal (509). When the pilot signal is multiplied by the weight vector, it is desirable to weight the pilot signal through calculation of phase delay, which is delay between reference antenna and each antenna element.

Then, each signal at traffic channels is retrieved separately (505) by correlating the array output with each of Walsh codes assigned to each corresponding channel. Also, the weighted pilot signal for compensating the phase distortion is applied to each of traffic channels separately to produce phase-compensated data (513).

In FIG. 12, period written as x1, x2, . . . , x8 denotes the integration period for descrambling the received signal in the pilot signal generating part (120). Results of the integrations are denoted as y1, y2, . . . , y7, respectively.

The demodulation apparatus with above-described structures and functions makes it possible in the smart antenna system that each user be tracked accurately and high speed wide-band communication be provided by weighting the received data carried in the traffic channels in chip-rate with the weights computed from the pilot channel in the reverse link.

The demodulation apparatus disclosed is for each user's channel card. As an example, the channel card with four the finger at each user's channel card has been introduced in this document. However, it is clear that number of the fingers to be assigned at each user can be set with any proper selection depending on given signal environment and/or convenience.

FIG. 11 illustrates a flow chart of the demodulation method using the finger in which the received signal are weighted in chip-rate as described in this invention. FIG. 12 illustrates how much processing delay is encountered in the demodulation procedure adopting the finger that operates in chip-rate.

According to FIG. 11, the demodulation method disclosed in this invention can be explained as follows: the received signal is descrambled in the complex descrambler (501) using the frame timing information (f_timing) by multiplying the received signal by the PN-code, then, the pilot signal is produced by integrating (503) the descrambled data, then, the beam-forming parameter, i.e., the weight vector, is computed (505) from the descrambled received signal and the pilot signal. Computing time required for obtaining the weight vector is dependent upon processor and algorithm used in the weight vector computing part, although it has been written as being a single snapshot period in example shown in this invention.

Then, after the received signal is multiplied by the weight vector in the general weighting part, results of multiplications are summed up to produce the array output (507). Then, the pilot signal for compensating the phase distortion due to the path delay is produced (509) by multiplying the array output by PN-code and integrating results of multiplication. In practice, procedure of generating the array output (507) and pilot signal (509) for compensating the phase distortion can be achieved simultaneously.

Then, each signal at traffic channels is retrieved separately (511) by correlating the array output with each of Walsh codes assigned to each corresponding channel. Then, the pilot signal for compensating the phase distortion is applied to each of traffic channels separately to produce phase-compensated data (513).

In FIG. 12, period written as x1, x2, . . . , x8 denotes the integration period for descrambling the received signal in the pilot signal generating part #1 (120). Results of the integrations are denoted as y1, y2, . . . , y7, respectively.

The weight vector computing part (130) receives two inputs, one is the x_vector and the other is y_vector. As the y_vector is integration result of the x_vector, y1 in FIG. 12 is available after the integration of corresponding x1 is completed. Similarly, as weight vector w1 uses both the x1 and y1, the weight vector w1 is available after consuming another computation time, which is assumed as being one snapshot period for easy explanation. As integration output from multiplication w1 and x3 is necessary to compensate channel, p1 is obtained after another computation time. From above, w2 is multiplied by p1 from the pilot signal generating part #2 (150) at same time and, then, used for channel estimation for chip duration denoted by x41.

From above, it is analysed that received signal for duration of x1 is applied to x4 which is delayed three computation time. This result comes from condition that there are no butters between each block. If buffering blocks are used in this invention, even though time for obtaining result is delayed (when w1 is applied to x1 duration, time for channel compensation is delayed as three computation time is necessary), performance degradation due to two computations delayed x4 can be avoided.

Processing means according to this invention can be implemented through software and recorded on recording medium (CD-ROM, ROM, RAM, floppy disk, hard disk, magnetic-optical disk, etc.) that can be read through computer program for implementing.

This invention takes an example of apparatus operating in CDMA2000 (called IS-2000 or IMT-2000) but it is clear that the finger disclosed in this invention can be applied to such as WCDMA. Also, the data rate of traffic channels is to help understand meaning of this invention and not confined to CDMA2000 system.

Optimum weight vector can be calculated by using the pilot signal in 3G mobile communication systems, because the traffic signal and the pilot signal are transmitted from mobile station. Symbol-rate weighting is possible because optimum weight vector using the pilot signal is applied to each traffic channel after Walsh despreading.

According to this invention, interference can be reduced dramatically and capacity of communication be increased as weighting information is extracted from pilot channel which can have long integration interval. Also, performance of searcher and tracker can be enhanced when the phase diversity technology is used. System performance is enhanced remarkably as exact phase compensation is accomplished by multiplying pilot signal received from array antenna with weight vector obtained from weight-vector computing part.

In the technique areas that are related to this invention, anyone with common knowledge of college-graduate level can recognize that any changes or modifications within the limit of this invention are possible from the figures and explanations in this document.

What is claimed is:

1. A finger operating in chip-rate, comprising:
   a descrambling means that descrambles base-band received signals by using frame timing information;
   a first pilot retrieving means for retrieving a pilot signal that is to be used as input of a weight vector computing means to compute the weight vector;
   the weight vector computing means that produces the weight vector by using signals from the descrambling means and the first pilot retrieving means;
   a general weighting means for producing a general weighted signal, by compensating phase delay of the base-band received signal with the weight vector;
   a second pilot retrieving means for retrieving the pilot signal that is to be used to compensate path delay, by using outputs of the general weighting means and a PN-code;
   a Walsh despreading means for providing received data for each of traffic channels, by using outputs of the general weighting means, the PN-code, and corresponding Walsh codes; and
   a channel compensation means for compensating phase distortion caused by the path delay to each output of the Walsh despreading means, by using output of the second pilot retrieving means.

2. The finger according to claim 1, further comprises a tracking means for producing a frame tracking information that is used to compensate small changes of the path delay.

3. The finger according to claim 2, wherein the tracking means produces the frame tracking information from difference between two energies which are obtained by integrating results of early and late descrambling wherein a first and a second synch time information are used, respectively.

4. The finger according to claim 2, wherein the tracking means produces the frame tracking information from difference between two energies which are obtained by squaring weighted sums of integrations of descrambled signals provided through early and late descrambling wherein a first and a second synch time information are used, respectively.

5. The finger according to claim 2, wherein the tracking means produces the frame tracking information from difference between two energies which are obtained by squaring results of integrations of weighted sums between the weight vector and descrambled signals provided through early and late descrambling wherein a first and a second synch time information are used, respectively.

6. The finger according to claim 3, wherein the tracking means produces the frame tracking information from difference between two energies which are obtained by integrating results of the early and late descrambling wherein the first and the second synch time information are used, respectively, such the frame tracking information is produced after filtering the difference between the two energies.

7. The finger according to claim 4, wherein the tracking means produces the frame tracking information from difference between two energies which are obtained by integrating results of the early and late descrambling wherein the first and the second synch time information are used, respectively, such the frame tracking information is produced after filtering the difference between the two energies.

8. The finger according to claim 5, wherein the tracking means produces the frame tracking information from difference between two energies which are obtained by integrating results of the early and late descrambling wherein the first and the second synch time information are used, respectively, such the frame tracking information is produced after filtering the difference between the two energies.

9. The finger according to claim 3, wherein the first synch time information for the early descrambling is earlier than the frame timing information by about 0.2 to 0.5 chip duration while the second synch time information for the late descrambling is later than the frame timing information by about 0.2 to 0.5 chip duration.

10. The finger according to claim 4, wherein the first synch time information for the early descrambling is earlier than the frame timing information by about 0.2 to 0.5 chip duration while the second synch time information for the late descrambling is later than the frame timing information by about 0.2 to 0.5 chip duration.

11. The finger according to claim 5, wherein the first synch time information for the early descrambling is earlier than the frame timing information by about 0.2 to 0.5 chip duration while the second synch time information for the late descrambling is later than the frame timing information by about 0.2 to 0.5 chip duration.

12. The finger according to claim 1, wherein the descrambling means multiplies the received signal in digital state (I_rx, Q_rx) with a local PN-code using a finger timing information (f_timing) provided from outside finger.

13. The finger according to claim 1, wherein the first pilot retrieving means retrieves the pilot signal to be used as input of weight vector computing means by integrating output (y vector signal) of the descrambling means for preset period of time.

14. The finger according to claim 13, wherein the weight vector computing means produces the weight vector (Weight_I, Weight_Q) using the x_vector signal and the y_vector signal.

15. The finger according to claim 14, wherein the weight vector computing means is reset to initial state upon reception of frame reset signal (f_reset) which is generated by finger death signal (f_death) when the PN-code acquisition is lost such that PN-code acquisition for lost path can be restarted with initial state.

16. The finger according to claim 1, wherein the general weighting means produces the general weighted signal, by compensating phase delay of the base-band received signal with the weight vector.

17. The finger according to claim 1, wherein the Walsh despreading means includes:
   FCH (fundamental channel) despreading means for retrieving data transmitted through FCH (fundamental channel) by multiplying result of the descrambling of an away output with the Walsh code corresponding to the FCH;

DCCH (dedicated control channel) despreading means for retrieving data transmitted through DCCH (dedicated control channel) by multiplying result of the descrambling of the array output with the Walsh code corresponding to the DCCH;

SCH 1 (Supplemental channel 1) despreading means for retrieving data transmitted through SCH 1 by multiplying result of the descrambling of the away output with the Walsh code corresponding to the SCH 1; and SCH 2 (Supplemental channel 2) despreading means for retrieving data transmitted through SCH 2 by multiplying result of the descrambling of the away output with the Walsh code corresponding to the SCH 2.

18. The finger according to claim 17, wherein the channel compensating means is located for compensating the phase distortion due to path delay associated with each of traffic channels the FCH, the DCCH, the SCH 1, and the SCH 2.

19. The finger according to claim 18, further comprising: a tracking means, for providing exact chip synchronization through the fine-tuning of PN-code acquisition, the tracking means includes:
first complex descrambling means for multiplying the received signal with the PN-code of ½ chip advanced time to the f_timing;
second complex descrambling means for multiplying the received signal with the PN-code of ½ chip retarded time to the f_timing;
first and second energy estimation means for providing correlation energies by integrating results of early descrambler and late descrambler, respectively; and
tracking information (f_trk) generating means for providing the tracking information (f_trk) by comparing magnitudes of results of the first and second energy estimation means.

20. A demodulation apparatus that uses fingers operating in chip-rate for mobile communication system comprising:
an analog-to-digital converter (ADC) for converting analog signal, which has been frequency-down converted to base-band, to corresponding digital signal through oversampling procedure;
a searcher for transmitting a searcher-energy that exceeds preset threshold value to lock detector while the searcher-energy is computed through correlation procedure between output of the ADC and a PN-code corresponding to pilot channel;
a lock detector for generating signals needed for accurate frame synchronization including frame reset information (f_reset), frame timing information (f_timing), frame death information (f_death) using the correlation energy provided from the searcher; and
at least one finger for weighting in chip-rate traffic channel signals with weights which are obtained from received data in the pilot channel of a reverse link.

21. The demodulation apparatus according to claim 20, wherein the finger comprises:
a descrambling means for descrambling received signals given in base-band from the ADC with the local PN-code by using frame timing information;
a first pilot retrieving means for retrieving a pilot signal that is to be used as input of a weight vector computing means to compute the weight vector;
the weight vector computing means that produces the weight vector by using signals from the descrambling means and the first pilot retrieving means;
a general weighting means for producing a general weighted signal, by compensating phase delay of the base-band received signal with the weight vector;
a second pilot retrieving means for retrieving the pilot signal that is to be used to compensate path delay, by using outputs of the general weighting means and a PN-code;
a Walsh despreading means for providing received data for each of traffic channels, by using outputs of the general weighting means, the PN-code, and corresponding Walsh codes; and
a channel compensation means for compensating phase distortion caused by the path delay to each output of the Walsh despreading means, by using output of the second pilot retrieving means.

22. The demodulation apparatus according to claim 21, wherein the finger further comprises a tracking means that produces a frame tracking information for compensating small changes in path delay.

23. The demodulation apparatus according to claim 20, wherein the searcher comprises:
a received signal processing means for achieving envelope detection of the received data such that the correlation energy to be obtained at each antenna channel;
an adding means for summing up the correlation energies at each of antenna channels obtained from the received signal processing means; and
an output means for generating result of the adding means as final output of non-coherent detection.

24. The demodulation apparatus according to claim 23, wherein the received signal processing means comprises:
a first arithmetic means for computing magnitude of the correlation energy at each antenna channel by adding results of square of processing results along I-channel and Q-channel; and
a second arithmetic means for summing up results of computed magnitude of the correlation energy at each of antenna channels.

25. A demodulation method using fingers that operates in chip-rate for mobile communication system, comprising:
a first step of descrambling received signal said fingers by multiplying a PN-code with a received signal using frame timing information (f_timing);
a second step of generating a pilot signal obtained by integrating a descrambled signal in order to use it for computing weights;
a third step of computing a weight vector using the descrambled data and the pilot signal;
a fourth step of generating an array output by summing up the results of multiplication between the weight vector and the received signal in such a way that inter-element phase difference be compensated;
a fifth step of generating the pilot signal for compensating phase distortion due to channel delay by integrating result of the multiplication of the PN-code and the away output;
a sixth step of separating each channel signal from the array output through a Walsh despreading procedure; and
a seventh step of compensating a phase distortion due to a channel delay by applying the pilot signal to each channel signal which has been obtained through the Walsh despreading procedure.

26. The demodulation method according to claim 25, wherein the fourth step of generating the array output and the fifth step of retrieving the pilot signal for compensating phase distortion is performed in a single step.

27. A computer-readable recording medium for recording a program that embodies a method using fingers operating in chip-rate, comprising:

a first function of descrambling a received signal by multiplying a PN-code to the received signal using frame timing information;

a second function of generating the pilot signal as input of computing a weight vector by integrating a descrambled signal;

a third function of computing the weight vector by using the descrambled signal and the pilot signal;

a fourth function of generating an array output by first multiplying the received signal by a weight vector and then summing up results of multiplications of the received signal and the weight vector;

a fifth function of retrieving the pilot signal for compensating phase distortion due to path delay by integrating multiplication of the PN-code and the away output;

a sixth function of separating the array output into each of traffic channel signals through a Walsh despreading; and a seventh function of compensating the each traffic channel data despreaded through the sixth function using the pilot signal retrieved through the fifth function.

* * * * *